United States Patent
Fox et al.

(10) Patent No.: US 9,102,103 B2
(45) Date of Patent: Aug. 11, 2015

(54) THERMOPLASTIC COMPOSITE PARTS HAVING INTEGRATED METAL FITTINGS AND METHOD OF MAKING THE SAME

(75) Inventors: James R. Fox, Florissant, MO (US); Randall D. Wilkerson, O'Fallon, MO (US); Alexander M. Rubin, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 1265 days.

(21) Appl. No.: 11/699,653

(22) Filed: Jan. 29, 2007

(65) Prior Publication Data

US 2007/0175573 A1    Aug. 2, 2007

Related U.S. Application Data

(63) Continuation-in-part of application No. 11/347,122, filed on Feb. 2, 2006, now Pat. No. 7,807,005, and a continuation-in-part of application No. 11/584,923, filed on Oct. 20, 2006, now Pat. No. 8,333,858.

(51) Int. Cl.
*B29C 70/34* (2006.01)
*B29C 70/50* (2006.01)
(Continued)

(52) U.S. Cl.
CPC ............... *B29C 70/34* (2013.01); *B29C 70/50* (2013.01); *B29C 70/525* (2013.01);
(Continued)

(58) Field of Classification Search
CPC ...... B29C 70/34; B29C 70/50; B29C 70/525; B29C 70/545; B29C 70/885; B32B 15/08
See application file for complete search history.

(56) References Cited

U.S. PATENT DOCUMENTS 2,440,228 A    4/1948  Yardeny et al.
2,708,288 A    5/1955  Fuller et al.
(Continued)

FOREIGN PATENT DOCUMENTS

BE    834458        2/1976
DE    1504302 A1    4/1969
(Continued)

OTHER PUBLICATIONS

Thermoplastic Composite Sheet Forming Alfred C. Loos and Romesh C Batra, Department of Engineering Science and Mechanics, VA Polytechnic Institute and State University, Blacksburg, VA 24061.
(Continued)

*Primary Examiner* — Christopher Schatz
(74) *Attorney, Agent, or Firm* — Yee & Associates, P.C.

(57) ABSTRACT

Thermoplastic composite parts having integrated metal fittings are manufactured using a continuous compression molding process. Automated equipment or hand lay-up are used to collate composite material plies and metal fittings into a multi-layer stack. Each stack contains all plies, including ply build-up areas, tacked in the proper location to maintain orientation and location. Multiple lay-ups may be cut from each stack. The lay-ups are placed in tooling containing part features and are continuously fed through a performing station where the lay-ups are preformed into the approximate shape of the finished part. Following pre-forming, the tooling is moved incrementally through a consolidation station where a compression press presses successive sections of the tooling to form a single integrated thermoplastic composite laminate part having integrated metal fittings, which may include areas of differing thickness.

24 Claims, 9 Drawing Sheets

(51) Int. Cl.

| | | |
|---|---|---|
| *B29C 70/52* | (2006.01) | |
| *B29C 70/54* | (2006.01) | |
| *B29C 70/86* | (2006.01) | |
| *B29C 70/88* | (2006.01) | |
| *B29D 99/00* | (2010.01) | |
| *B32B 15/08* | (2006.01) | |
| *B32B 27/08* | (2006.01) | |
| *B32B 27/28* | (2006.01) | |
| *B32B 3/08* | (2006.01) | |
| *B29K 101/12* | (2006.01) | |

(52) U.S. Cl.
CPC .............. *B29C 70/545* (2013.01); *B29C 70/86* (2013.01); *B29C 70/885* (2013.01); *B29D 99/0007* (2013.01); *B32B 3/085* (2013.01); *B32B 15/08* (2013.01); *B32B 27/08* (2013.01); *B32B 27/285* (2013.01); *B32B 27/286* (2013.01); *B32B 27/288* (2013.01); *B29K 2101/12* (2013.01); *B32B 2262/101* (2013.01); *B32B 2262/106* (2013.01); *B32B 2605/003* (2013.01); *B32B 2605/18* (2013.01); *Y10T 156/1002* (2015.01)

(56) References Cited

U.S. PATENT DOCUMENTS

| | | | |
|---|---|---|---|
| 4,061,817 A | 12/1977 | Maxel | |
| 4,151,031 A * | 4/1979 | Goad et al. | 156/201 |
| 4,414,266 A | 11/1983 | Archer et al. | |
| 4,414,269 A | 11/1983 | Lubowitz et al. | |
| 4,462,946 A * | 7/1984 | Goldsworthy | 264/442 |
| 4,571,355 A | 2/1986 | Elrod | |
| 4,608,220 A | 8/1986 | Caldwell et al. | |
| 4,674,712 A | 6/1987 | Whitener et al. | |
| 4,749,613 A * | 6/1988 | Yamada et al. | 442/366 |
| 4,759,815 A | 7/1988 | Frey | |
| 4,818,460 A * | 4/1989 | Nied | 264/310 |
| 4,913,910 A | 4/1990 | McCarville et al. | |
| 4,980,013 A | 12/1990 | Lowery | |
| 5,021,283 A | 6/1991 | Takenaka et al. | |
| 5,026,447 A * | 6/1991 | O'Connor | 156/166 |
| 5,026,514 A * | 6/1991 | Hauwiller et al. | 264/258 |
| 5,043,128 A * | 8/1991 | Umeda | 264/258 |
| 5,057,175 A * | 10/1991 | Ashton | 156/202 |
| 5,064,439 A | 11/1991 | Chang et al. | |
| 5,139,407 A | 8/1992 | Kim et al. | |
| 5,182,060 A * | 1/1993 | Berecz | 264/70 |
| 5,192,330 A | 3/1993 | Chang et al. | |
| 5,413,472 A | 5/1995 | Dietterich et al. | |
| 5,681,513 A | 10/1997 | Farley | |
| 5,716,487 A | 2/1998 | Sumerak | |
| 5,759,325 A | 6/1998 | Davis | |
| 5,820,804 A | 10/1998 | Elmaleh | |
| 5,958,550 A | 9/1999 | Childress | |
| 6,007,917 A | 12/1999 | Weigel et al. | |
| 6,024,555 A | 2/2000 | Goodridge et al. | |
| 6,162,314 A | 12/2000 | Kassuelke et al. | |
| 6,291,049 B1 | 9/2001 | Kunkel et al. | |
| 6,319,346 B1 | 11/2001 | Clark et al. | |
| 6,425,969 B1 | 7/2002 | van den Akker | |
| 6,689,448 B2 | 2/2004 | George et al. | |
| 6,696,009 B2 | 2/2004 | Davis | |
| 6,764,057 B2 | 7/2004 | Fanucci et al. | |
| 6,869,558 B2 | 3/2005 | Polk, Jr. et al. | |
| 7,186,361 B2 | 3/2007 | Kasai et al. | |
| 7,191,982 B2 | 3/2007 | Vetillard et al. | |
| 7,300,693 B2 | 11/2007 | Albers et al. | |
| 7,419,372 B2 | 9/2008 | Kasai et al. | |
| 7,431,875 B2 | 10/2008 | Rule | |
| 7,513,769 B2 | 4/2009 | Benson et al. | |
| 7,670,525 B2 | 3/2010 | Weidmann et al. | |
| 7,807,005 B2 | 10/2010 | Rubin et al. | |
| 7,871,553 B2 | 1/2011 | Wilkerson et al. | |
| 8,151,529 B2 | 4/2012 | Weidmann et al. | |
| 8,163,221 B2 | 4/2012 | Suzuki et al. | |
| 2002/0088549 A1 | 7/2002 | Fanucci et al. | |
| 2002/0135093 A1 | 9/2002 | Davis | |
| 2003/0044570 A1 | 3/2003 | George et al. | |
| 2003/0168555 A1 | 9/2003 | Livi et al. | |
| 2003/0175520 A1 | 9/2003 | Grutta et al. | |
| 2003/0232176 A1 | 12/2003 | Polk, Jr. et al. | |
| 2004/0009338 A1 * | 1/2004 | Jo et al. | 428/297.4 |
| 2004/0096535 A1 | 5/2004 | Hudecek et al. | |
| 2005/0029707 A1 | 2/2005 | Kasai et al. | |
| 2005/0053765 A1 | 3/2005 | Albers et al. | |
| 2005/0056362 A1 * | 3/2005 | Benson et al. | 156/163 |
| 2005/0252603 A1 | 11/2005 | Rule | |
| 2006/0011289 A1 | 1/2006 | Suriano | |
| 2006/0083806 A1 | 4/2006 | Kasai et al. | |
| 2006/0216480 A1 | 9/2006 | Weidmann et al. | |
| 2006/0226288 A1 | 10/2006 | Vetillard et al. | |
| 2006/0249868 A1 | 11/2006 | Brown et al. | |
| 2007/0175571 A1 | 8/2007 | Rubin et al. | |
| 2007/0175572 A1 | 8/2007 | Rubin et al. | |
| 2007/0175575 A1 | 8/2007 | Rubin et al. | |
| 2008/0168619 A1 | 7/2008 | Gonzalez et al. | |
| 2008/0185756 A1 | 8/2008 | Wilkerson et al. | |
| 2008/0277058 A1 | 11/2008 | Schmier, II et al. | |
| 2009/0065977 A1 | 3/2009 | Suzuki et al. | |
| 2009/0074905 A1 | 3/2009 | Matsen et al. | |
| 2009/0078362 A1 | 3/2009 | Wilkerson et al. | |
| 2010/0148005 A1 | 6/2010 | Weidmann et al. | |
| 2010/0225016 A1 | 9/2010 | Prebil et al. | |
| 2010/0319841 A1 | 12/2010 | Rubin et al. | |
| 2011/0206906 A1 | 8/2011 | Rubin et al. | |
| 2012/0175049 A1 | 7/2012 | Suzuki et al. | |

FOREIGN PATENT DOCUMENTS

| | | |
|---|---|---|
| DE | 1629830 A1 | 1/1971 |
| DE | 2165470 A1 | 7/1973 |
| DE | 2647821 A1 | 4/1978 |
| DE | 3709480 A1 | 10/1988 |
| DE | 4017978 A1 | 12/1991 |
| DE | 29711917 U1 | 8/1997 |
| EP | 0024895 A2 | 3/1981 |
| EP | 0277727 A1 | 8/1988 |
| EP | 0317861 A2 | 5/1989 |
| EP | 1 336 469 A1 | 2/2002 |
| EP | 1336469 A1 * | 8/2003 |
| EP | 1504880 A1 | 2/2005 |
| EP | 1614624 A1 | 1/2006 |
| EP | 1666353 A1 | 6/2006 |
| EP | 1813404 A2 | 8/2007 |
| EP | 1995040 A1 | 11/2008 |
| EP | 2014448 A2 | 1/2009 |
| FR | 2587649 A1 | 3/1987 |
| FR | 2888155 A1 | 1/2007 |
| GB | 531357 | 1/1941 |
| GB | 1157239 | 7/1969 |
| WO | 8302085 A1 | 6/1983 |
| WO | 8810186 A1 | 12/1988 |
| WO | 2007092371 A2 | 8/2007 |
| WO | 2008073164 A2 | 6/2008 |
| WO | 2008094227 A1 | 8/2008 |
| WO | 2008097847 A1 | 8/2008 |
| WO | 2010101744 A2 | 9/2010 |
| WO | 2011106117 A1 | 9/2011 |

OTHER PUBLICATIONS

International Search Report and Written Opinion for PCT/US2007/022234 Oct. 17, 2007.
USPTO Office Action dated Jun. 18, 2012 regarding U.S. Appl. No. 11/697,378, 20 pages.
USPTO Final Office Action dated Jun. 15, 2012 regarding U.S. Appl. No. 12/711,401, 33 pages.
USPTO Office Action dated Jul. 5, 2012 regarding U.S. Appl. No. 11/701,789, 30 pages.
Response to Final Office Action dated Jul. 16, 2012 regarding U.S. Appl. No. 11/584,923, 11 pages.

(56) References Cited

OTHER PUBLICATIONS

USPTO Notice of Allowance dated Jul. 25, 2012 regarding U.S. Appl. No. 11/584,923, 19 pages.
Cai et al., "Consolidation Techniques and Cure Control," In: Handbook of Composites, Second Edition, Peters (Ed.), Chapman & Hall, London, 1998, pp. 576-577.
Final Office Action, dated Dec. 13, 2012, regarding U.S. Appl. No. 11/701,789, 9 pages.
Office Action, dated Feb. 20, 2013, regarding U.S. Appl. No. 12/398,071, 24 pages.
Office Action, dated Jan. 18, 2013 regarding U.S. Appl. No. 12/711,401, 32 pages.
International Search Report dated Oct. 23, 2007, regarding Application No. PCT/US2007/003021 (WO2007092371), 3 pages.
International Search Report dated Oct. 27, 2008, regarding Application No. PCT/US2007/018611 (WO2008073164), 3 pages.
International Search Report dated Jul. 17, 2008, regarding Application No. PCT/US2008/052806 (WO2008097847), 2 pages.
International Search Report dated Oct. 28, 2010, regarding Application No. PCT/US2010/025176 (WO2010101744), 5 pages.
International Search Report dated Apr. 28, 2011, regarding Application No. PCT/US2011/022003 (WO2011106117), 3 pages.
Prebil et al., U.S. Appl. No. 13/419,187, filed Mar. 13, 2012, 67 pages.
Preliminary Amendment, dated Aug. 1, 2008, regarding U.S. Appl. No. 11/347,122, 39 pages.
USPTO Office Action, dated Mar. 12, 2009, regarding U.S. Appl. No. 11/347,122, 16 pages.
Response to Office Action, dated Apr. 6, 2009, regarding U.S. Appl. No. 11/347,122, 14 pages.
USPTO Final Office Action, dated Jul. 9, 2009, regarding U.S. Appl. No. 11/347,122, 8 pages.
Response to Final Office Action, dated Sep. 9, 2009, regarding U.S. Appl. No. 11/347,122, 13 pages.
USPTO Office Action, dated Nov. 23, 2009, regarding U.S. Appl. No. 11/347,122, 9 pages.
Response to Office Action, dated Mar. 19, 2010, regarding U.S. Appl. No. 11/347,122, 16 pages.
USPTO Final Office Action, dated Jun. 24, 2010, regarding U.S. Appl. No. 11/347,122, 12 pages.
Response to Final Office Action, dated Jun. 29, 2010, regarding U.S. Appl. No. 11/347,122, 9 pages.
USPTO Notice of Allowance, dated Jul. 21, 2010, regarding U.S. Appl. No. 11/347,122, 6 pages.
USPTO Office Action, dated Feb. 4, 2010, regarding U.S. Appl. No. 11/584,923, 16 pages.
Response to Office Action, dated May 4, 2010, regarding U.S. Appl. No. 11/584,923, 27 pages.
USPTO Final Office Action, dated Jul. 13, 2010, regarding U.S. Appl. No. 11/584,923, 12 pages.
Response to Final Office Action, dated Nov. 15, 2010, regarding U.S. Appl. No. 11/584,923, 23 pages.
USPTO Office Action, dated Jul. 27, 2011, regarding U.S. Appl. No. 11/584,923, 10 pages.
Response to Office Action, dated Jan. 27, 2012, regarding U.S. Appl. No. 11/584,923, 14 pages.
USPTO Office Action, dated Apr. 15, 2010, regarding U.S. Appl. No. 11/697,378, 28 pages.
USPTO Final Office Action, dated Oct. 27, 2010, regarding U.S. Appl. No. 11/697,378, 20 pages.
USPTO Office Action, dated Jul. 27, 2011, regarding U.S. Appl. No. 11/697,378, 19 pages.
USPTO Final Office Action, dated Mar. 2, 2012, regarding U.S. Appl. No. 11/697,378, 6 pages.
USPTO Office Action, dated Oct. 1, 2009, regarding U.S. Appl. No. 11/701,789, 17 pages.
USPTO Final Office Action, dated Mar. 25, 2010, regarding U.S. Appl. No. 11/701,789, 15 pages.
USPTO Office Action, dated Jun. 21, 2010, regarding U.S. Appl. No. 11/701,789, 11 pages.
USPTO Final Office Action, dated Dec. 29, 2010, regarding U.S. Appl. No. 11/701,789, 14 pages.
USPTO Office Action, dated Apr. 20, 2011, regarding U.S. Appl. No. 11/701,789, 15 pages.
USPTO Final Office Action, dated Oct. 12, 2011, regarding U.S. Appl. No. 11/701,789, 17 pages.
USPTO Office Action, dated Sep. 11, 2009, regarding U.S. Appl. No. 11/859,057, 10 pages.
USPTO Final Office Action, dated Mar. 23, 2010, regarding U.S. Appl. No. 11/859,057, 10 pages.
USPTO Notice of Allowance, dated Oct. 4, 2010, regarding U.S. Appl. No. 11/859,057, 9 pages.
USPTO Office Action, dated Jan. 24, 2011, regarding U.S. Appl. No. 12/398,071, 14 pages.
USPTO Final Office Action, dated Jun. 8, 2011, regarding U.S. Appl. No. 12/398,071, 9 pages.
USPTO Office Action, dated Dec. 16, 2011, regarding U.S. Appl. No. 12/711,401, 21 pages.
Rubin et al., "Method for Fabricating Thermoplastic Composite Parts," U.S. Appl. No. 13/673,989 and Preliminary Amendment, filed Nov. 9, 2012, 52 pages.
European Patent Office Communication, dated Aug. 9, 2011, regarding Application No. EP08728832.0, 5 pages.
Final Office Action. dated Sep. 19, 2012, regarding U.S. Appl. No. 11/697,378, 10 pages.
Final Office Action, dated Apr. 16, 2012, regarding U.S. Appl. No. 11/584,923, 9 pages.
Notice of Allowance, dated Nov. 20, 2013, regarding U.S. Appl. No. 12/398,071, 9 pages.
Office Action, dated Jan. 22, 2014, regarding U.S. Appl. No. 13/673,989, 30 pages.
Final Office Action, dated Mar. 27, 2014, regarding U.S. Appl. No. 13/673,989, 12 pages.
Office Action, dated Jun. 6, 2014, regarding U.S. Appl. No. 13/673,989, 11 pages.
Office Action, dated Jul. 18, 2014, regarding U.S. Appl. No. 13/419,187, 44 pages.
Canadian Intellectual Property Office Communication, dated Jul. 22, 2014, regarding Application No. 2,673,448, 2 pages.
Final Office Action, dated Jan. 2, 2015, regarding U.S. Appl. No. 13/673,989, 19 pages.
Office Action dated Mar. 4, 2015, regarding U.S. Appl. No. 131934,884, 35 pages.

* cited by examiner

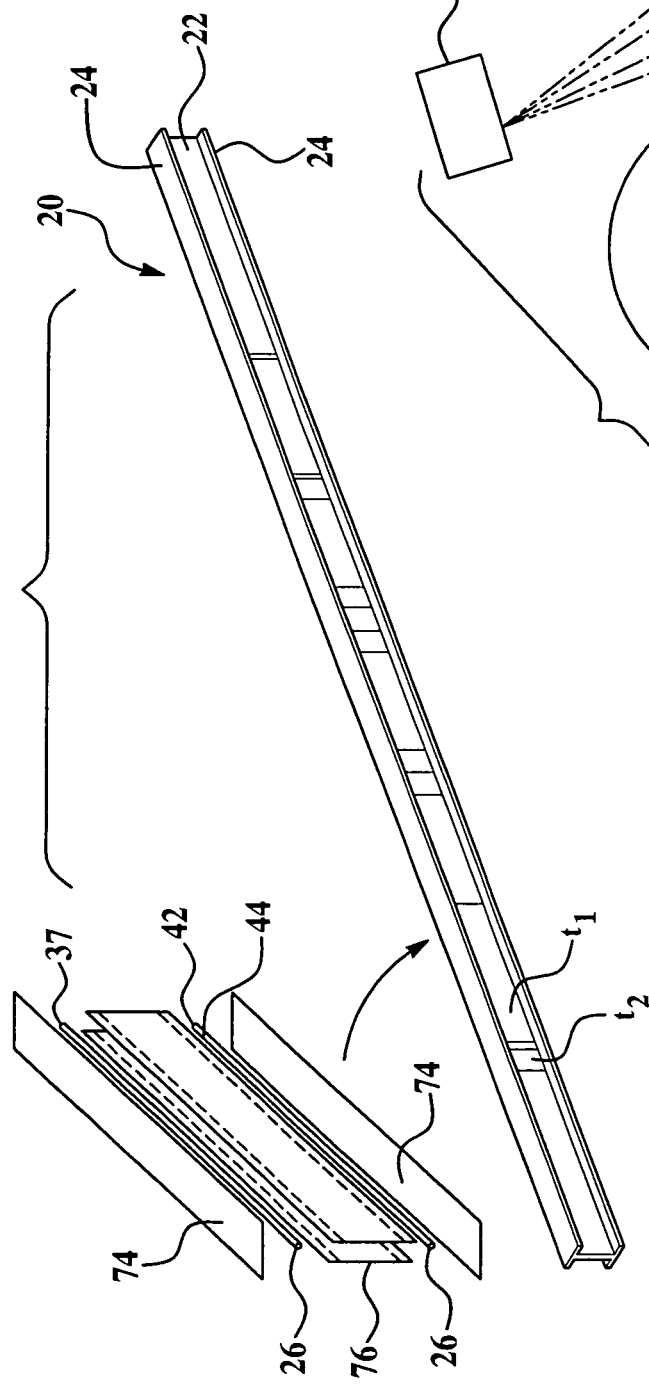
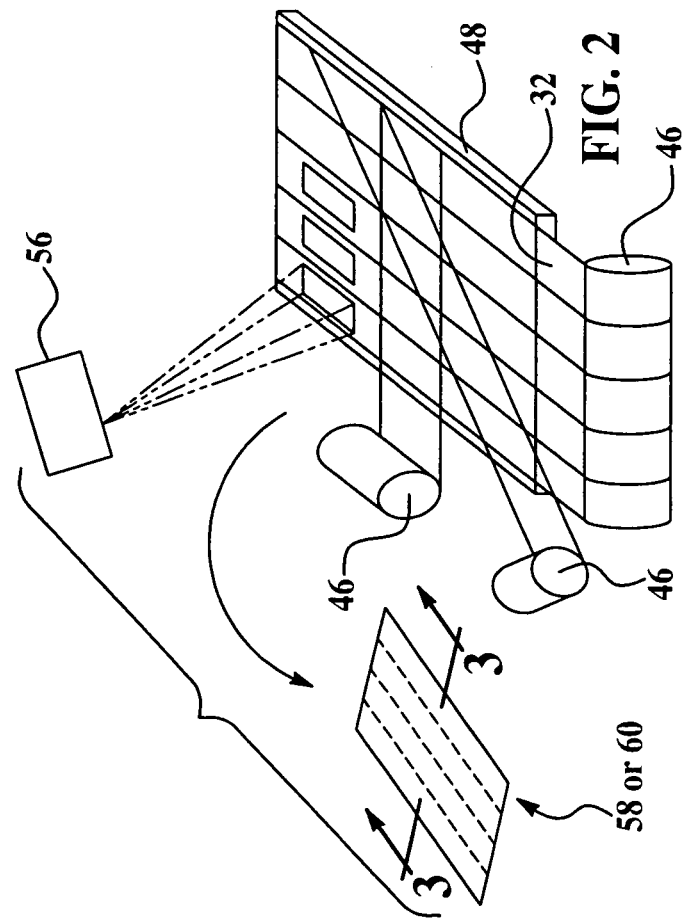

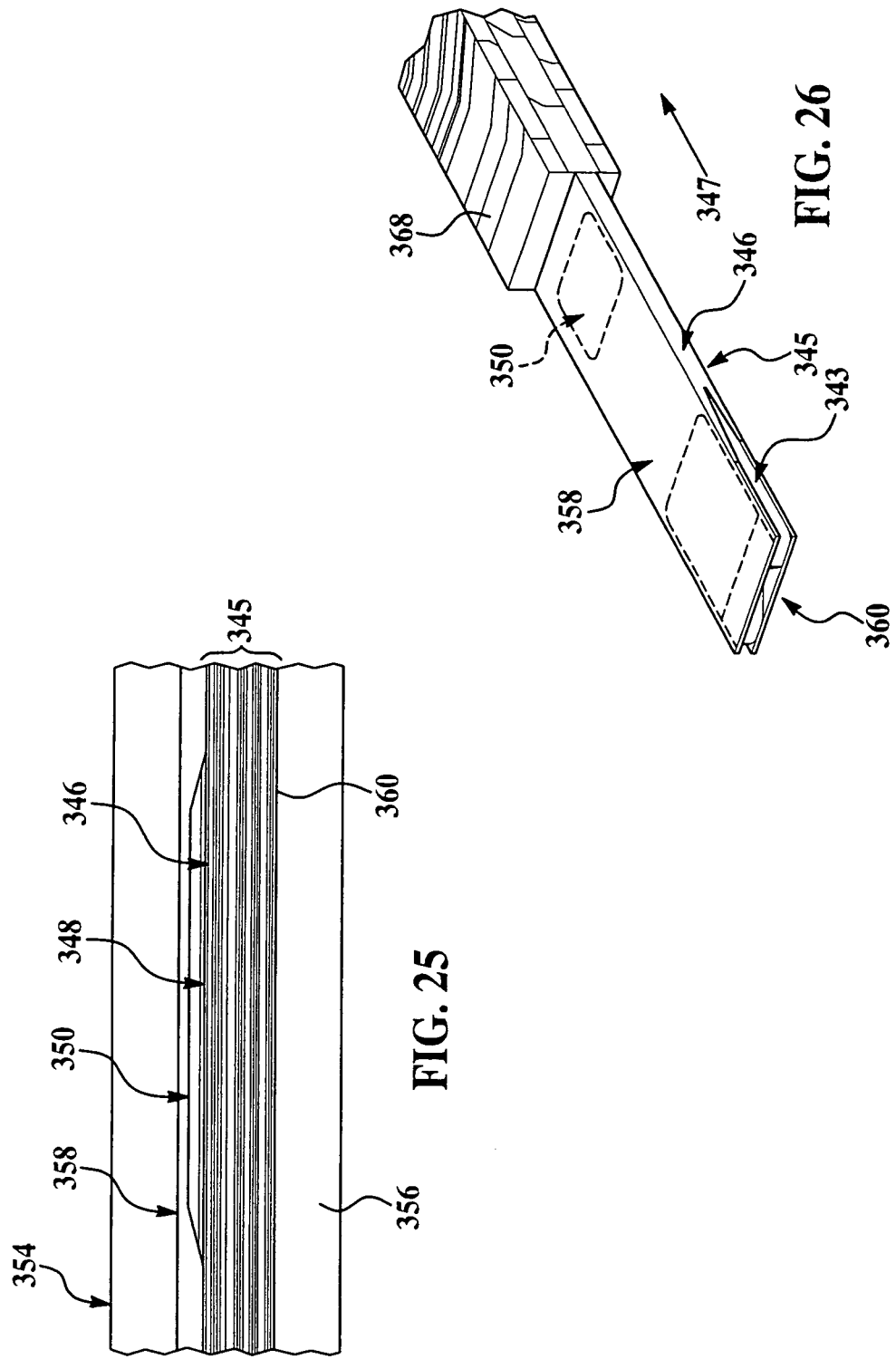

THERMOPLASTIC COMPOSITE PARTS HAVING INTEGRATED METAL FITTINGS AND METHOD OF MAKING THE SAME

CROSS REFERENCE TO RELATED APPLICATIONS

This application is a continuation-in-part of U.S. patent application Ser. No. 11/347,122, filed Feb. 2, 2006 now U.S. Pat. No. 7,807,005, and of U.S. patent application Ser. No. 11/584,923, filed Oct. 20, 2006 now U.S. Pat. No. 8,333,858.

TECHNICAL FIELD

This disclosure generally relates to processes for fabricating composite material parts, and deals more particularly with a method for making thermoplastic composite parts having integrated metal fittings, using a continuous part forming process.

BACKGROUND

Numerous processes exist for fabricating Thermoplastic composite (TPC) laminates. In addition to non-continuous processes such as pressing, stamping and autoclave forming, there are continuous processes such as extrusion, pultrusion, roll forming, and compression molding. More recently, processes have been developed for producing TPC parts in continuous lengths using a continuous compression molding (CCM) process, which have varying thickness and/or curvature along their lengths.

Adding to the challenge of manufacturing TPC laminate structures and parts in a continuous process, is the need to attach metal fittings to the laminate structures. Metal fittings may be used, for example, in the aircraft industry, to attach the laminate structures to other parts of the aircraft, or to reinforce areas of the laminate structure requiring additional stiffness. In the past, metal fittings were first formed as separate features, and then joined to laminate structures using fastening devices. This approach to adding metal fittings to laminate structures and parts is generally not cost effective, requires additional time and material and adds weight to the aircraft. Processes exist for forming bonded joints between TPCs and metal fittings, however these bonded joints must be processed in ovens or autoclaves which limits the length of the parts that can be processed due to the size capacity of commercially available equipment.

Accordingly, a need exists for a method for fabricating TPC structures and parts having integrated metal fittings in a continuous process. Embodiments of the disclosure are directed towards satisfying this need.

SUMMARY

Embodiments of the disclosure provide a method for fabricating thermoplastic composite laminate parts having integrated metal fittings, using a continuous fabrication process. The parts may have tailored and/or varying thicknesses, as well as curvature. The process utilizes automated equipment or hand lay-up to collate parts or components into a multilayer stack. Each stack contains all laminate plies, including ply build-up areas, tacked in the proper location to maintain orientation and location. Consolidation tooling is provided which contains all necessary part features and is coordinated to customized multiple ply stacks to form a single integrated composite laminate potentially having areas of differing thicknesses. Composite part having integrated metal fittings formed by the above method may find use in a wide variety of applications, including, for example, automotive and aerospace applications.

In accordance with one embodiment of the disclosure, a method is provided for manufacturing a thermoplastic composite laminate structure having an integrated metal fitting. The method includes the steps of: forming a lay-up including a multiple ply stack of thermoplastic composite material and at least one metal fitting; feeding the lay-up through a press; and, consolidating the plies and the fitting using the press. A film of thermoplastic material is introduced between the metal fitting and one of the plies to improve bonding. The plies of the stack may be tacked together in order to maintain their relative orientation during the fabrication process. A joint between the metal fitting and the laminate structure may take any of various forms, including a double-lap splice, scarf, stepped lap, or rabbet, to name a few. The lay-up containing the metal fitting is placed between tooling which is moved continuously through pre-forming and consolidation operations. The lay-up is preformed in the pre-forming operation into the approximate shape of the laminate structure. Following pre-forming, the plies and metal fitting are consolidated in a compression press.

In accordance with another embodiment, a method is provided for manufacturing thermoplastic composite laminate parts having metal fittings in a continuous process. The method includes the steps of: collating multiple plies of a thermoplastic composite material; providing metal fittings for the parts; forming a plurality of lay-ups, each including the collated plies and at least one of the metal fittings; pre-forming each of the lay-ups into the approximate shape of the part; and, consolidating the plies and the metal fitting by incrementally moving the lay-ups through a continuous compression molding press. The plies are configured so as to form a joint of a chosen geometry, between the metal fitting and laminate plies in each of the stacks. The lay-ups containing the metal fittings are placed between tools that are configured to impart features to the preformed lay-up during the consolidation process. The preformed lay-ups are heated to at least the free-flowing temperature of the matrix resin component in the ply material during the consolidation process. The metal fittings are cleaned and then primed before a resin film is applied to the primed surfaces of the fitting in order to improve bonding.

According to another embodiment, thermoplastic laminate parts each having at least one integrated metal fitting are produced by a continuous manufacturing process. The process comprises the steps of: forming a plurality of lay-ups, each including a tacked stack of multiple plies of thermoplastic composite material and at least one metal fitting; placing a set of tooling over each of the lay-ups; continuously moving the lay-ups through a pre-forming station; pre-forming each of the lay-ups at the pre-forming station into the approximate shape of the part; continuously moving the tooling with the preformed lay-ups through a press; and, consolidating the plies in the lay-ups and the fittings by compressing successive sections of the tooling as the tooling moves through the press. The lay-ups may be formed by collating and tacking the plies so that the plies are held in fixed, registered relationship to each other, and to the metal fitting. The tooling containing the lay-ups is moved through the press in incremental steps so that the press consolidates successive sections of the lay-up.

Other features, benefits and advantages of the disclosed embodiments will become apparent from the following description of embodiments, when viewed in accordance with the attached drawings and appended claims.

BRIEF DESCRIPTION OF THE ILLUSTRATIONS

FIG. 1 are combined exploded and perspective illustrations of a thermoplastic composite laminate formed in accordance with an embodiment of the disclosure.

FIG. 2 is a perspective illustration of a conveyor table used to form a tailored multiplayer stack.

FIG. 25 is a cross sectional illustration of a laminate structure having an integrated metal fitting positioned between consolidation tooling.

FIG. 26 is a perspective illustration showing a lay-up and consolidation tooling being fed to a continuous compression molding machine.

DETAILED DESCRIPTION

Figure 3:
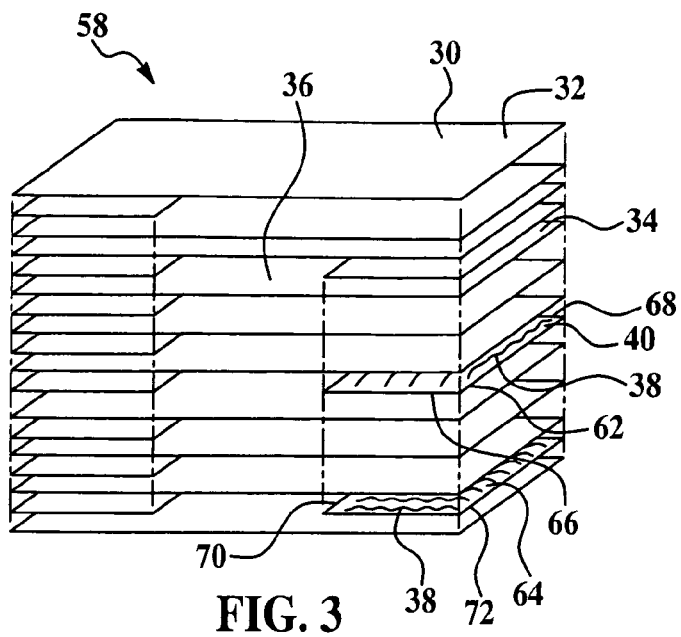
FIG. 3 is a perspective illustration of one example of a tailored multi-layer stack formed in FIG. 2.

Embodiments of the disclosure provide a novel fabrication method of forming a thermoplastic composite ("TPC") laminate structure or part having one or more integrated metal fittings, in a continuous process. The TPC structures may have varying or tailored thicknesses and/or curvature along their lengths. The embodiments find applicable uses in a wide variety of potential applications, including for example, in the aerospace industry. The preferred embodiments are ideally suited for forming thermoplastic composite stiffened members in the supporting framework of an aircraft fuselage. Potential examples of thermoplastic composite stiffened members include but are not limited to fuselage skins, wing skins, control surfaces, door panels and access panels. Stiffening members include but are not limited to keel beams, floor beams, and deck beams.

Referring now to FIG. 1, a thermoplastic composite laminate, here a thermoplastic composite laminate floor beam 20 having tailored and varying thickness regions t1 and t2 is illustrated as having a web region 22 coupled at either end to a respective pair of cap regions 24. The web region 22 and pair of cap regions 24 are formed as a single integrated laminate structure by consolidating a pair of non-uniform thickness tacked multi-layer ply sheet stacks 76 with a pair of thermoplastic composite filler nuggets 26 and further with a pair of uniform thickness tacked multi-layer ply sheet stacks 74. Although sheet stack 76 is shown as comprising 2 plies, it is to be understood that either of the sheet stacks 74 and 76 may include any number of plies, depending on the application. It will also be understood that cap regions 24, which are shown in FIG. 1 as having a uniform thickness and one ply, may similarly be provided with regions of varying thicknesses and/or a plurality of plies.

In alternative versions (not shown), a thermoplastic composite laminate such as the floor beam 20 may alternatively be formed by consolidating one or more uniform or non-uniform tacked multi-layer ply sheets 74,76 with either one or more single ply (shown as 32 in FIGS. 2 and 3) of a thermoplastic composite material 30, one or more partial ply (shown as 34 in FIG. 3) of a thermoplastic material 30, or one or more uniform or non-uniform thickness tacked multi-layer tacked stacks 74, 76, and any combination thereof, in a similar method to that described herein. Further, one or more filler nuggets 26 may also be used in combination thereof to form further alternative versions of the thermoplastic composite laminate 20. The method for forming the thermoplastic composite floor beam 20 as shown in FIG. 1 is described below in more detail in conjunction with FIGS. 2-6.

The thermoplastic materials 30 used in plies 32, 34 include thermoplastic matrix polymers (shown as 40 in FIG. 3) such as polyetheretherketone ("PEEK"), polyetherketoneketone ("PEKK"), polyphenylsulfone ("PPS"), polyetherimide ("PEI") preferably reinforced with a fibrous component (shown as 38 in FIG. 3) such as glass (s-type or e-type) or carbon fiber. The fibers 38 within each ply 32, 34 of the thermoplastic materials 30 may be oriented in a unidirectional or non-uniform arrangement, depending upon the particular application. As one of ordinary skill recognizes, the relative types, thicknesses, amounts of fibers 38 within the matrix resin 40, as well as the type of matrix resin utilized in each ply 32, 34 may vary greatly, based on numerous factors, including cost and the ultimate desired physical and mechanical properties of the thermoplastic laminate composite 20. Further, the relative orientation of the unidirectional fibers in one ply 32, 34 relative to another ply 32, 34 may also affect the mechanical properties of the thermoplastic composite laminate 20.

The nuggets 26 are preferably formed from a thermoplastic material 37 that is compatible with the thermoplastic material 30 via extrusion or other well-known forming process. Preferably the matrix resin composition 42 of the nuggets 26 is the same as the matrix resin composition 40 of the materials 30. In addition, the filler nuggets 26 may utilize fibers 44 similar to the fibers 38 contained within the thermoplastic material 30.

Referring now to the logic flow diagram (FIG. 6) and the processing diagrams (FIGS. 2-5), the method for forming the TPC laminate floor beam 20 of FIG. 1 begins in Step 150 by providing preformed plies 32, 34 of the thermoplastic materials 30 and preformed filler nuggets 26 each retained on roller 46 or other retention devices.

Next, in Step 160, multiple plies 32, 34 of the thermoplastic materials 30 are stacked in a desired configuration to form either a non-uniform thickness or uniform thickness untacked multi-layer ply sheet stack 58 or 60 using either a hand lay-up or automated process.

In the automated process, as shown in FIG. 2, a plurality of plies 32 or 34 (FIG. 3) of the thermoplastic material 30 are unrolled from rollers 46 onto a conveyor table 48 to form a collated multi-layer non-uniform thickness or uniform thickness multi-layer ply stack 58 or 60. The rollers 46 may be situated at one end, or along the sides of the conveyor table 48 to lay respective ply layers 32, 34 at a particular orientation with respect to another adjacent layer 32, 34. Thus, for example, a lower layer of a full ply 32 may be laid having unidirectional fibers 38 extending in one direction, while the next respective upper full ply 32 may have unidirectional fibers 38 laid in another direction (for example, at 45 or 90 degrees relative to the underlying ply 32). A laser projector 56 located above the conveyor table 48 ensures proper location of the local or partial plies 34 and/or pockets 36 relative to the full plies 32.

An example of an untacked, non-uniform thickness multi-layer sheet stack 58 made according to the process of FIG. 2 is shown in FIG. 3, which shows various full and partial plies 32, 34 and further showing pockets 36 created between plies 32, 34. Moreover, FIG. 3 shows partial plies 62, 64 having unidirectional fibers 38 laid in a 90-degree relative orientation with respect to one another, here showing partial ply 62 laid in a first orientation (fibers 38 extending from front 66 to back 68), while partial ply 64 is laid in a different orientation (fibers 38 extending from side 70 to side 72). Of course, while not shown, plies may have fibers 38 at other relative orientations to one another, ranging from perpendicular to one another (i.e. a 0/90 arrangement) to parallel with one another (i.e. a 0/0 arrangement) and every conceivable angle there between (including, for example a 0/30 orientation, a 0/60, 0, 45, 90 orientation etc.).

Next, in Step 170, some or all of various plies 32, 34 of the untacked stacks 58, 60 formed in FIG. 2 may be tacked together at various predetermined locations to form either a uniform or non-uniform thickness tacked multi-layer ply sheet stack 74, 76. Preferably, the stacks 58, 60 are tacked together using a soldering iron or ultrasonic welder (not shown) to form the respective stack 74, 76, although other devices used to couple together various plies 32, 34 of thermoplastic materials known to those of ordinary skill are also specifically contemplated. The amount and location of tacking among the plies 32, 34 are dependent upon numerous factors, including but not limited to the number and location of the various plies 32, 34 and pockets 64. Moreover, the amount of tacking should be sufficient to form a substantially integrated tacked stack 74, 76 that can be transported as a single part.

In Step 175, the tacked stacks 74, 76 may then be cut into smaller pieces, or are ready for use in forming the thermoplastic composite laminates such as floor beam 20 of FIG. 1.

Next, in Step 180, a combination of at least one uniform or non-uniform thickness tacked stack 74, 76, and at least one of either a non-uniform thickness tacked stack 76, a uniform thickness tacked stack 74, or a single ply 32, and optionally at least one filler nugget 26 of thermoplastic material 30, 37 are fused together in a consolidation structure 78 to form a single integrated thermoplastic composite laminate such as floor beam 20. One preferred consolidation structure 78 specifically designed to form the thermoplastic composite laminate floor beam 20 of FIG. 1 is illustrated in FIGS. 4 and 5 below.

Figure 4:
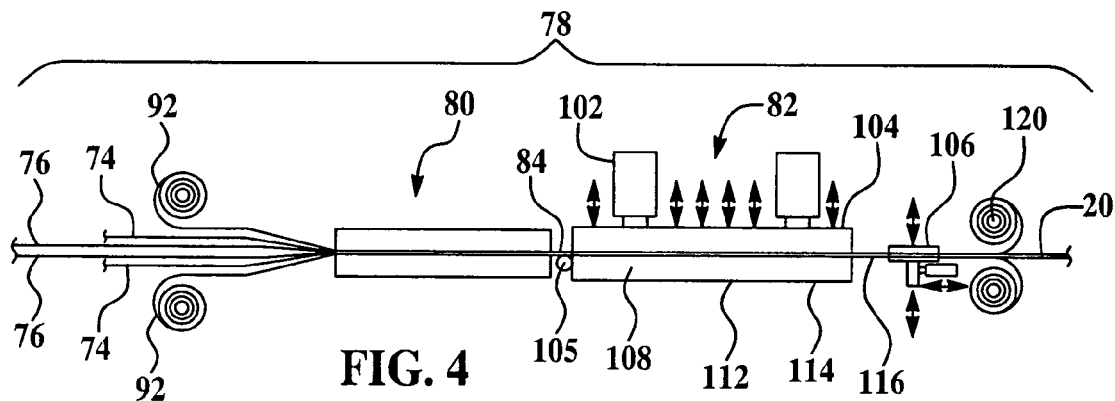
FIG. 4 illustrates a pre-forming zone and a consolidating zone of a consolidation structure used to form the thermoplastic composite laminate of FIG. 1.
Figure 5:
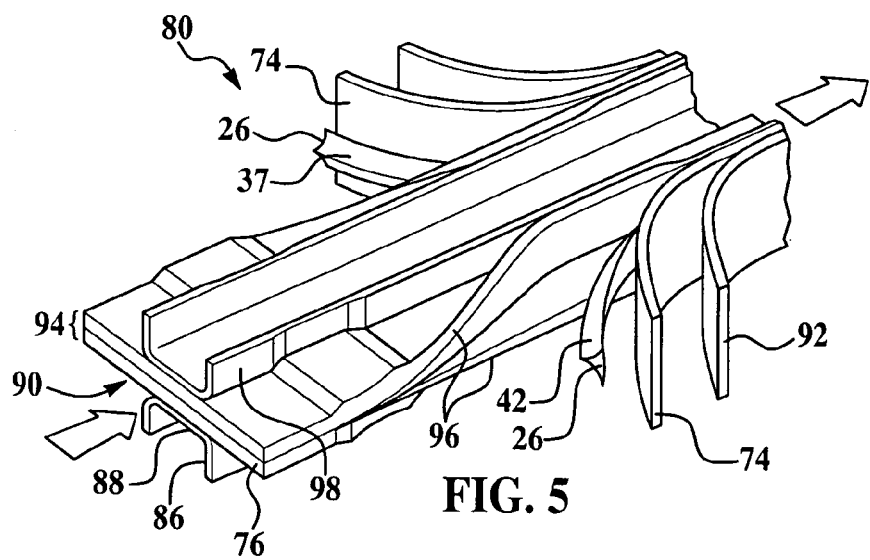
FIG. 5 is a perspective illustration of the pre-forming zone of the consolidation structure of FIG. 4.
Figure 6:
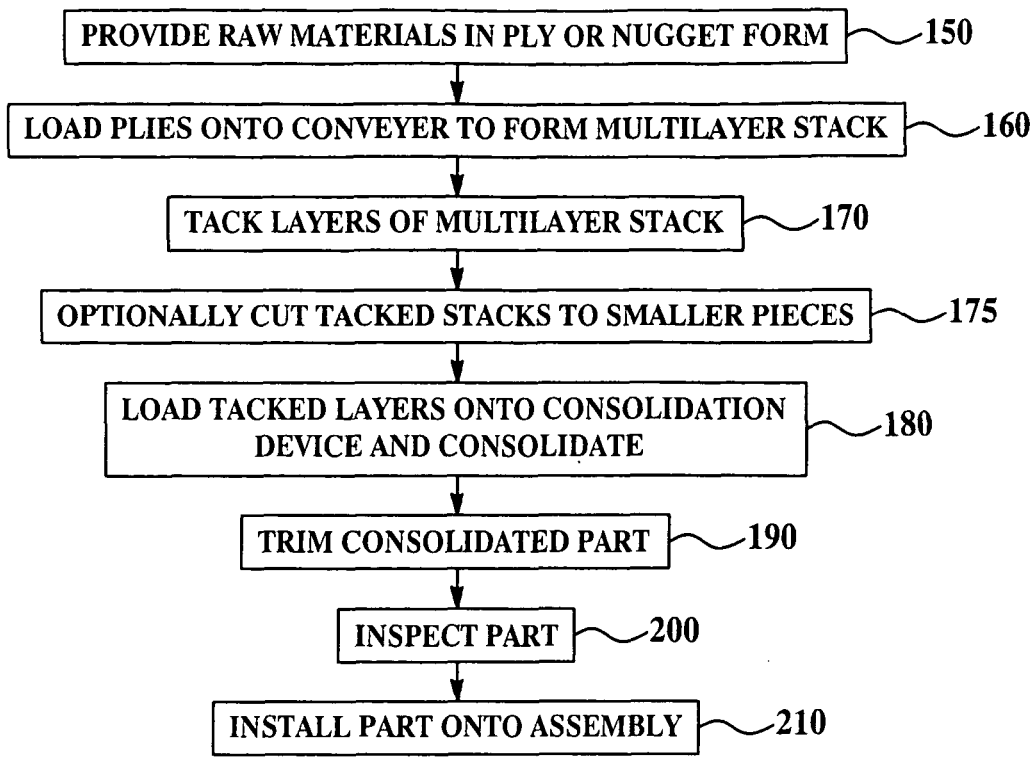
FIG. 6 is a logic flow diagram describing the preferred method for forming the thermoplastic composite laminate of FIG. 1 in accordance with FIGS. 2-5.
Figure 7A:
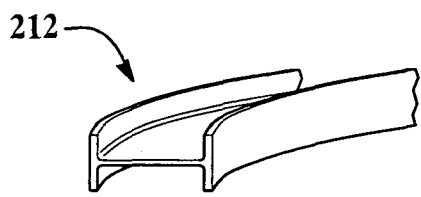
FIGS. 7a-7f are perspective illustration representing examples of curved, thermoplastic composite laminate parts formed in accordance with an embodiment of the disclosure.
Figure 7B:
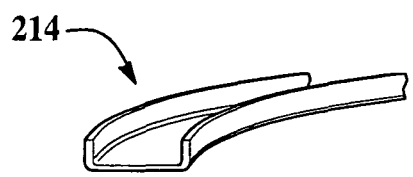
Figure 7C:
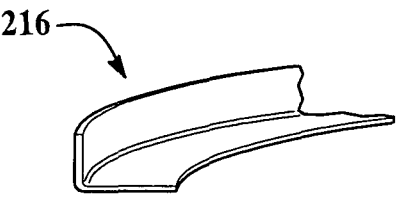
Figure 7D:
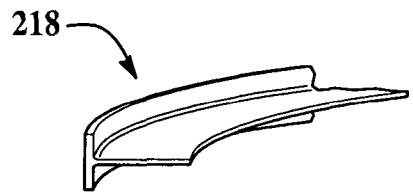
Figure 7E:
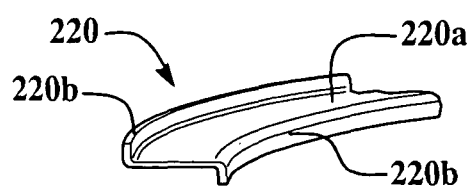
Figure 7F:
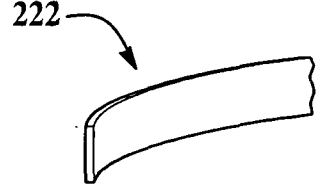

Referring now to FIGS. 4 and 5, the consolidation structure 78 may include a pre-forming zone 80 and a consolidation zone 82. In the performing zone 80, a combination of at least one uniform or non-uniform thickness tacked stack 74, 76, optionally at least one filler nugget 26, and at least one of either a non-uniform thickness tacked stack 76, a uniform thickness tacked stack 74, or a single ply 32, FIGS. 2 and 3, of thermoplastic material are loaded in their proper orientations in a continuous process and preformed to the desired shape at an elevated temperature to form the preformed part 84. The preformed part 84 then exits the performing zone 80 and enters the consolidation zone 82, wherein it is consolidated to form a single, integrated thermoplastic composite laminate such as floor beam 20 as described in FIG. 1 above. The elevated temperature used in performing the part should be sufficiently high to cause softening of the tacked stacks 74, 76 or the single ply 32 so that the layers may be bent during the performing process. However, the elevated temperature should be below a temperature at which the polymeric component of the matrix resin 40, 42 has the consistency of a viscous liquid.

Referring now to FIG. 5, the pre-forming zone 80 of the consolidation structure 78 includes a pair of U-shaped tooling channels 86 having a central portion 88 separated by a gap 90 and a pair of side tooling sheet members 92. Sheet members 92 may also be called mandrels 92. Preferably, the channels 86 and side-tooling sheet members 92 are formed of materials such as stainless steel and the like, that are capable of handling repetitious, high-heat cycles.

A first pair 94 of tacked stacks 74 or 76 is introduced between the respective central portions 88 and within the gap 90 of the U-shaped channels 86. At the same time, an optional filler nugget 26 and either the additional tacked stack 74 or 76 or ply 32, are introduced along each flange 96 of the first pair 94 and within the respective side-tooling member 92. For the purposes of description in the following paragraphs with respect to the illustrations of FIGS. 4 and 5, the non-uniform thickness tacked stack 76 is shown as the first pair 94 introduced within the gap 90. The uniform thickness tacked stack 74 is shown being introduced at a position between the outer portion 98 of the U-shaped channels 86 and respective side-tooling member 92. Further, the ply layer 32 is not depicted in this description. While not shown, the U-shaped channels 86 include ramps and other features designed to match the laminate thickness variations (corresponding to t1 and t2 in FIG. 1) of the particular material (here the first pair 94 of non-uniform tacked stacks 76).

As the tacked stacks 74, 76 and nuggets 26 move through the performing zone 80 towards the consolidation zone 82, the flanges 96 of the first pair 94 of non-uniform thickness tacked stacks 76 on either side of the u-shaped channel 86 are bent outwardly under heat and pressure away from each other towards the respective outer portions 98 of the U-shaped channel 86. The flanges 96 are therefore coupled flat against the inner side of the uniform or non-uniform thickness tacked stacks 76, with the nuggets 26 located between the flanges 96 and the respective inner end of the uniform or non-uniform thickness tacked stacks 76. The heat within the pre-forming zone 80 is elevated sufficiently to allow deformation of the flanges 96 of the non-uniform thickness tacked stacks 76, but is below the temperature in which the polymeric component of the matrix resin 40, 42 of the respective stacks 74, 76 and nuggets 26 has the consistency of a viscous liquid. Bending of the flanges 96 is initiated by pressure applied to the flange 96 by external forming devices such as rollers (not shown) The side-tooling sheet members 92 squeeze the tacked stack 74 inwardly against the flange 96, causing additional pressure to be applied to the flange 96 which aids in bending the flange 96. The preformed part 84 is then ready to move to the consolidation zone 82.

Figure 16:
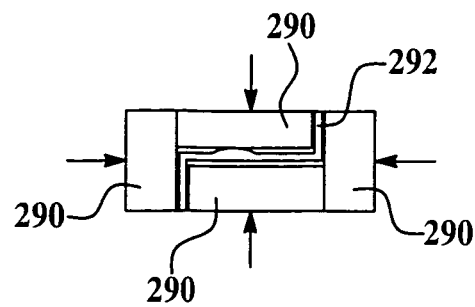
FIG. 16 is a sectional illustration, taken through the press, showing the dies compressing the preformed part using the consolidation tooling.

As best shown in FIG. 4, the preformed part 84 enters a separate or connected consolidating structure 102 within consolidation zone 82 on guide roller 105. The consolidating structure 102 includes a plurality of standardized tooling dies generally indicated at 104 that are individually mated with the outer surfaces of the U-shaped channels 86 and side-tooling sheet members 92. Additional details of the tooling dies 104 will be discussed later with reference to FIGS. 13 and 16. This commonality of the surfaces between the standardized dies 104 of the consolidating structure 102 and the outer surfaces of the channels 86 and sheet members 92 eliminates the need for part-specific, costly matched dies as well as eliminates start up times between different preformed parts having different ply configurations.

The consolidating structure 102 has a pulsating structure 106 that incrementally moves the preformed part 84 forward within the consolidation zone 82 and away from the pre-forming zone 80. As the part 84 moves forward, the part first enters a heating zone 108 that heats the part to a temperature which allows the free flow of the polymeric component of the matrix resin 40, 42 of the stacks 74, 76 and nuggets 26. Next, the part 84 moves forward to a pressing zone 112, wherein standardized dies 104 are brought down collectively or individually at a predefined force (pressure) sufficient to consolidate (i.e. allow free flow of the matrix resin) the various plies 32, 34 of the tacked stacks 74, 76 and nuggets 26 into its desired shape and thickness, here forming the web region 22 and pair of cap regions 24 of the floor beam 20. Each die 104 is formed having a plurality of different temperature zones with insulators. The dies 104 do not actually contact the part 84, but contact the outer surfaces of the U-shaped channels 86 and side tooling sheet members 92 opposite the part 84. Thus, the respective inner surfaces of the channels 86, 92 compress against the portion of the part 84. The compression may occur wherein all of the dies 104 compress in one independent yet coordinated step. The dies 104 are opened, and the part 84 is advanced within the consolidating zone 102 away from the pre-forming zone 80. The dies 104 are then closed again, allowing a portion of the part 84 to be compressed under force within a different temperature zone. The process is repeated for each temperature zone of the die 104 as the part 84 is incrementally advanced along the guide rollers 105 towards the cooling zone 114.

The formed and shaped part 84 then enters a cooling zone 114, which is separated from the pressing zone 112, wherein the temperature is brought below the free flowing temperature of the matrix resin 40, 42, thereby causing the fused or consolidated part to harden to its ultimate pressed shape 116. The pressed part 116 then exits the consolidating structure 102, wherein the side sheet members 92 are re-rolled onto rollers 120 as scrap.

While not shown, the consolidating structure 102 may have additional parts or devices that can introduce shapes or features into the pressed shape 116.

One preferred consolidating zone structure 102 that may be utilized is the so-called continuous compression molding ("CCM") process as described in German Patent Application Publication No. 4017978, published on Sep. 30, 1993, and herein incorporated by reference. However, other molding processes known to those of ordinary skill in the art are specifically contemplated by the disclosure, including but not limited to pultrusion or roll forming.

Next, in Step 190, the pressed part 116 is trimmed or otherwise post-processed to its desired final shape to form the thermoplastic composite laminate 20. In Step 200, the laminate 20 is inspected visually, preferably using ultrasonic non-destructive inspection techniques, or by other means to confirm that the laminate 20 is correctly shaped and does not contain any visual or other defects. After inspection, in Step 210, the laminate 20 such as the thermoplastic composite floor beam 20 may be installed onto its assembly. In the case of the floor beam 20, it is introduced within an aircraft fuselage.

While embodiments of the disclosure are described in terms of forming a thermoplastic composite floor beam 20 having essentially an I-beam shape, other potential shapes are specifically contemplated by the disclosure. This includes thermoplastic composite laminates having an L-shape, a C-shape, a T-shape, or even a flat panel shape in which thickness transitions may occur in any section of the part. These alternatively shaped laminates, or even other forms of the floor beam 20, are formed by consolidating one or more uniform or non-uniform tacked multi-layer ply sheets 74, 76 with either one or more plies 32 of a thermoplastic composite material 30, one or more partial plies 34 of a thermoplastic material 30, or one or more uniform or non-uniform thickness tacked multi-layer tacked stacks 74, 76, and any combination thereof, in a similar method to that described herein. Further, one or more filler nuggets 26 may also be used to form additional alternative versions of the thermoplastic composite laminates 20. To accomplish any of these alternative preferred variations, modifications to the tooling within the pre-forming zone 80 is necessary so as to match the desired thickness variations for the TPC laminate 20. For example, the U-shaped tool 86 of FIG. 5 is specific for forming I-beams such as floor beam 20 of FIG. 1, an alternatively shaped tool 86 having gaps 90 is used in forming C-shaped laminates, L-shaped laminates or flat beams having a taper between respective ply layers. Similar to the U-shaped tool 86, these alternative tools include regions not contacting the stacks 74, 76 that are matched to the standardized dies 104 within the consolidating zone 102.

While the embodiments are ideally suited for forming thermoplastic composite laminates, by using a modified single-step consolidation zone, thermosetting laminate composites can also be formed. In this modified version of the consolidation process, the heating and pressing zones achieve a temperature above the reaction or curing temperature of the matrix resin to form a thermosetting part. Accordingly, the single pressing process achieves a part having its ultimate desired shape without subsequent pressing steps.

Embodiments of the disclosure provide an innovative method to fabricate complex thermoplastic composite laminates with tailored and varying thickness in a continuous process. This innovative process utilizes automated equipment or hand lay-up to collate parts or components into a multi-layer stack. Each stack contains all plies, including ply build-up areas, tacked in the proper location to maintain orientation and location. The consolidation structure utilizes a two-stage method for forming the composite laminates from the multi-layer stacks and contains all necessary part features to achieve this result. The tooling, such as the U-shaped tool 86 in the pre-forming zone 80 is created with an appropriate shape to create the desired thickness variations in the formed TPC laminates 20 and is further designed to mate with standardized dies with the consolidation zone 82

The composite part formed by the above method may find use in a wide variety of applications, including, for example, automotive and aerospace applications. One example of a composite part formed in accordance with the disclosure is ideally suited for use as structural stiffened members, including thermoplastic composite laminate floor beams 20, in a commercial aircraft.

Referring now to FIGS. 7-15, an alternate embodiment may be used to manufacture thermoplastic laminate parts that are both curved and have tailored and/or varying thickness along their length. Curved laminates can be produced in which the curvature is either constant (circular) or variable along the length of the laminate part. As in the case of the embodiment previously described, the curved thermoplastic laminate part may include tailored areas and areas of varying thickness achieved by adding partial or local plies, or areas containing pockets. "Tailored" or "tailoring" refers to the profile of the part surface, wherein the selective addition or reduction of plies in specific areas of the part can be used to achieve a desired surface profile after the plies are consolidated during the compaction process. Curved parts produced by this embodiment of the method may be used in a variety of applications such as frames, rings, formers and structural aircraft stiffened members or fuselage skins, wing skins, door panels and access panels, keel beams, floor beams, and deck beams. The curved parts can be produced with a variety of cross sections, such as those shown in FIGS. 7a-7f. A fabricated part 212 having an I-section is shown in FIG. 7a while a part 214 having a U-section is shown in FIG. 7b. An L-section part 216 is shown in FIG. 7c and a T-section part is shown in FIG. 7d. A part 220 having a Z-section as shown in FIG. 7e and a part 222 having a simple rectangular section is shown in FIG. 7f. The parts shown in FIGS. 7a-7f may have either constant or variable curvature as previously mentioned, and may include areas of varying or tailored thickness at one or more points along their lengths.

Figure 8:
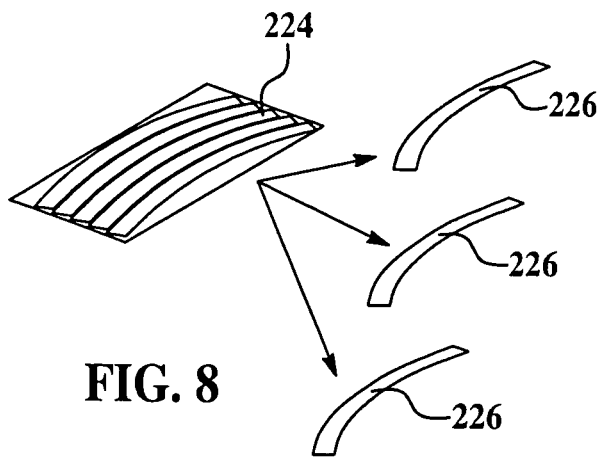
FIG. 8 is a perspective illustration of a tailored, multilayer stack of thermoplastic composite material, with three curved part blanks cut from the stack.

The preliminary steps in fabricating curved thermoplastic laminate parts in accordance with this embodiment of the method are similar to those previously described. A plurality of plies of thermoplastic material are deposited onto a conveyor table to form a collated, multi-layer non-uniform thickness or uniform thickness multi-ply stack, as previously described in connection with FIG. 2. The resulting, multi-layer stack is thus similar to the stack 58 shown in FIG. 3 which includes full and partial plies 32, 34 as well as pockets 36 created between plies 32, 34. Partial plies 62, 64 may also be included which have unidirectional fibers 38 arranged at alternating angles relative to the direction of orientation of the fibers. As previously described, the sheets in the multi-layer stack 58 are tacked together using a soldering iron or other heating device (not shown) so that the plies are held in fixed relationship to each other. A collated, tacked stack 224 produced by the method previously described is shown in FIG. 8.

The next step in the method for producing the curved composite parts comprises cutting individual part ply stacks or part blanks 226 from the collated stack 224. This cutting operation may be performed, for example, by a water jet cutter (not shown) operating under computer control which produces cut blanks 226 having an outer profile generally corresponding to the desired part curvature. As previously indicated, this curvature may be constant or may vary along the length of the part blank 226.

The part blanks 226 are fed along with a later described set of consolidation tooling 235 to a pre-forming station 275 (FIGS. 14 and 15) in a manner generally similar to that described previously with respect to producing non-curved composite parts. In the case of the present embodiment however, the consolidation tooling 235 and the blanks 226 move through a curved path as they are fed into the pre-forming station 275.

Figure 9:
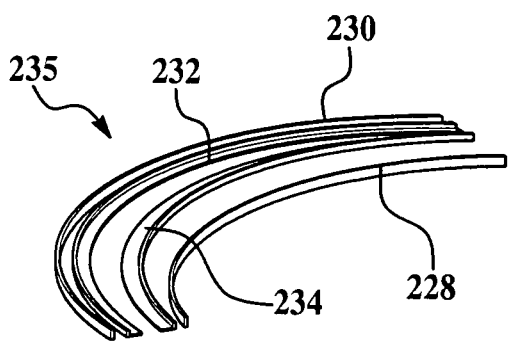
FIG. 9 is a perspective illustration of tooling used to form the curved thermoplastic composite parts in accordance with an embodiment of the disclosure.

The consolidation tooling 235 is shown in FIG. 9 and comprises curved inner and outer tooling sleeves 228, 230 as well as upper and lower tooling sleeves 232, 234. The upper and lower tooling sleeves 232, 234 each possess a curvature corresponding to that of the blanks 226, while the inner and outer tooling sleeves 228, 230 may be either similarly curved, or flexible so as to conform to the curvature of the part blank 226 during the pre-forming process. In the example illustrated in FIGS. 9, 14 and 15, the tooling sleeves 228-234 are configured to produce the Z-section part 220 shown in FIG. 7e. Although not specifically shown in the drawings, the part-side surfaces of the tooling sleeves 228-234 contain tooling features that produce mirror image features in the part, such as varying thicknesses, varying curvature, pockets, etc.

Figure 14:
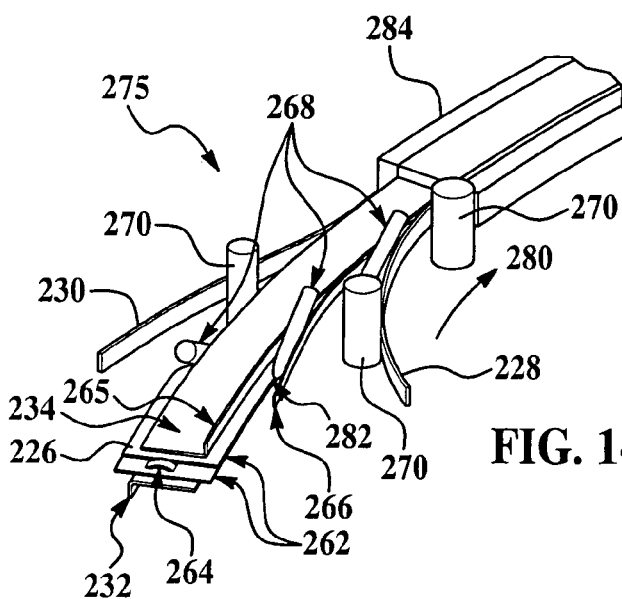
FIG. 14 is a perspective illustration of a pre-forming structure and a portion of a compaction press used in a method to produce curved composite parts.
Figure 15:
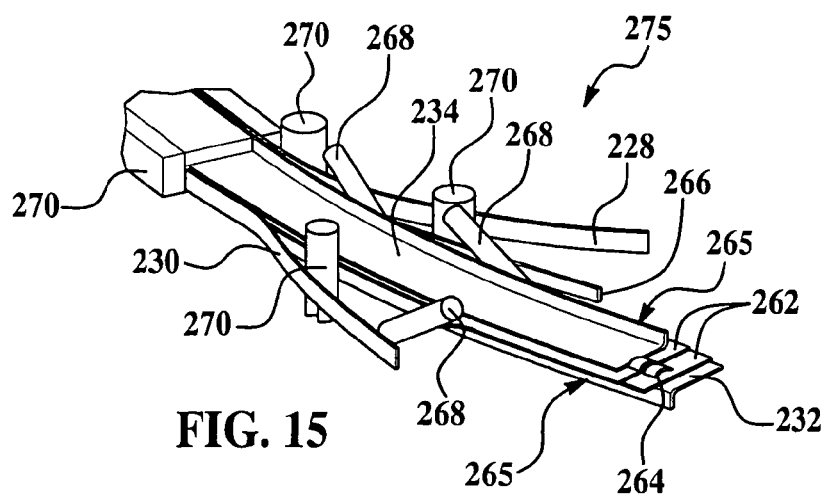
FIG. 15 is an illustration similar to FIG. 14 but showing the opposite side of the pre-forming structure and press.

Referring now particularly to FIGS. 14 and 15, the upper and lower tooling sleeves 232, 234 are assembled around the part blank 226 before the blank is fed in a curved path 280 into the pre-forming station 275 which includes a plurality of forming devices 268 and a set of guides 270. The part blank 226 can be seen to include a flat tacked stack 262 that comprises the web 220a and cap 220b (FIG. 7e) of the Z-section part 220, and a set of buildup plies 264 which form a local reinforcement of the beam web 220a.

As the sandwiched assembly comprising the part blank 226 and the tooling sleeves 232, 234 is fed into pre-forming station 275, the inner and outer tooling sleeves 228, 230 are fed into contact with the sandwiched assembly. Forming devices 268 function to deform edge portions of a blank 226 against flanges 265 on tooling sleeves 232, 234, thereby pre-forming the caps 220b of the Z-section part 220. Simultaneously, additional cap reinforcement plies 266 are fed between the forming devices 268 and the tooling flange 265. Guides 270 bring the inner and outer tooling sleeves 228, 230 into contact with the edges of the blank 226 which form the caps 220b. The preformed blank 226 along with the tooling sleeves 235 continue their movement in the curve path 280 through a curved press 284 such as a CCM machine which contains dies that impose force on the consolidation tooling 235. This force results in compaction and consolidation of the plies of the preformed part. Although not specifically shown in the drawings, heaters or ovens are provided as necessary to heat the part blank 226 to a temperature at which the polymeric component of the matrix resin in the part blank 226 has the consistency of a viscous liquid. Heating of the part blank 226 in this manner facilitates ply consolidation. In some cases, pre-heating of the part blank 226 may also be required to facilitate the pre-forming process. The need for pre-heating of the part blank 226 can depend on a number of factors, such as the number of plies, ply orientation, the type of material, the shape being preformed, etc.

Figure 17:
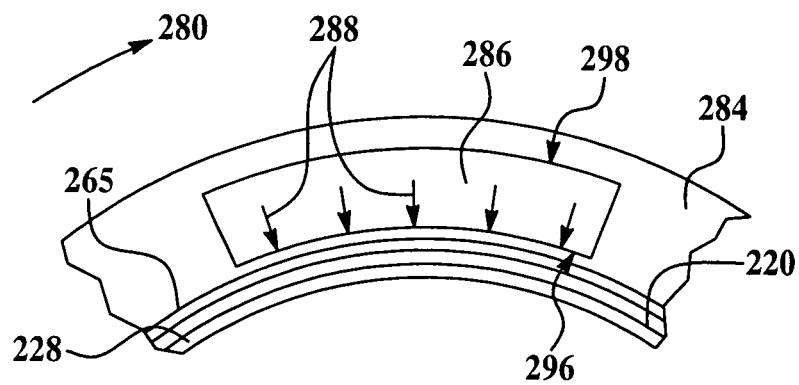
FIG. 17 is a fragmentary illustration of a section of the press, showing a curved die in relation to tooling sleeves for producing a part having a constant curvature.

The press 284 is essentially similar to that previously described in connection with FIG. 4. However unlike the press shown in FIG. 4, the dies used in press 284 will comprise some degree of curvature to accommodate the curved, preformed part 226. One such die 286 is shown in FIG. 17, where it can be seen that the inner face 296 of the die 286 has a curvature that matches the curvature of the flange 265 on the upper tooling sleeve 232. Die 286 moves inwardly in the direction of the arrows 288, into contact with the flange 265 during the compaction process, and in opposition to another curved die (not shown) which moves into contact with the inner tooling sleeve 228. The amount of curvature of the dies used in press 284 will depend, in part, on the shape of the curved part being produced and the shape of the tooling sleeves necessary for fabrication of the features in the part. The outer face 298 of the die 286 may be curved as shown in the FIG. 17, or may be flat. The preformed part is moved in the curved path 280, incrementally through the press 284. As the part movement is paused at each incremental step, the press dies impose heat and force on the tooling sleeves 235, resulting in consolidation of a section of the plies that lie beneath the dies.

Figure 18:
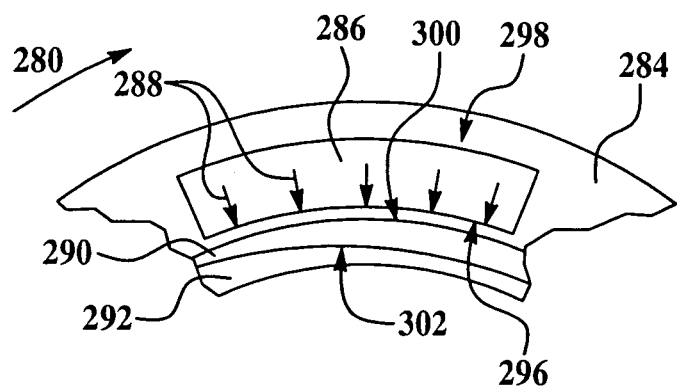
FIG. 18 is an illustration similar to FIG. 17 but showing tooling sleeves for producing a part having a non-uniform curvature.

As previously indicated, the laminated part may have a varying, rather than a constant curvature, along its length, and in this connection attention is directed to FIG. 18. A die 286 used to compact a curved preformed part 292 has a constant curved inner face 296 which engages the outer face 300 of a tooling sleeve 290. The outer face 300 of tooling sleeve 290 has a constant curvature, matching the curvature of the inner face 296 of the die 286, but has an inner face 302 that is curved with a radius different than that of the outer face 300 of the tooling sleeve 290, resulting in a part 292 having a non-constant outer radius.

Figure 10:
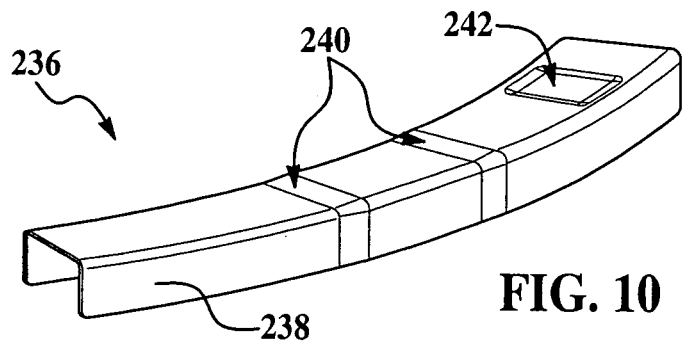
FIG. 10 is a perspective illustration of a curved tool used to impart features to the curved thermoplastic composite part.
Figure 11:
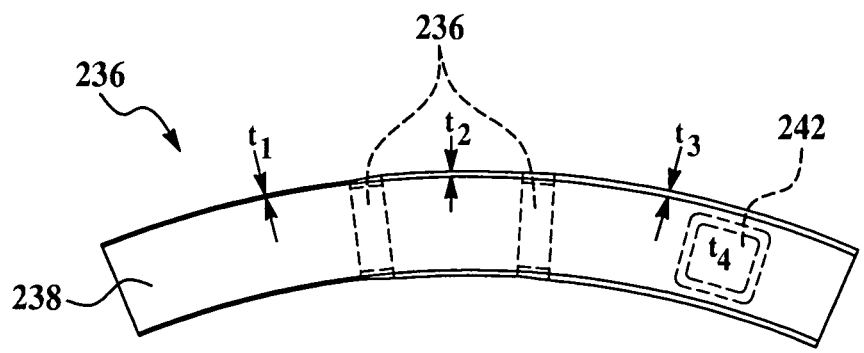
FIG. 11 is a bottom illustration of the tool shown in FIG. 10.

Another example of a curved thermoplastic laminate part 236 is shown in FIGS. 10 and 11 wherein the part has curvature over its length and has a body 238 which is U-shaped in cross section. The body 238 has a pair of sloped ramps 240 which form transitions in the thickness of the body 238 so that the part 236 has 3 sections of different thicknesses along its length. In addition, the top side of the body 238 is provided with a pocket or depression 242 representing an area of reduced thickness in the part 236. The differing thicknesses of the body 238 are represented by $t_1$, $t_2$, $t_3$, while the thickness of the pocket 244 is represented by $t_4$. Although part 236 possesses constant inner and outer curvatures, it is to be understood that the curvature may vary along the length of the part 236.

Figure 12:
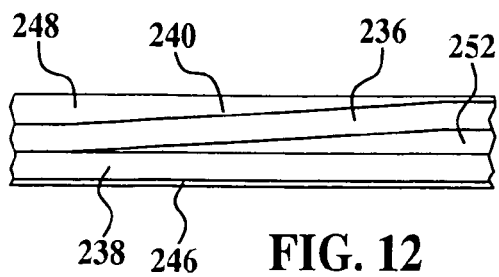
FIG. 12 is a fragmentary, cross sectional illustration showing a portion of a curve composite part captured between two portions of a tool.

FIG. 12 shows a portion of the part 236 held within tooling sleeves 246, 280 for consolidating the part plies. The part plies 236 can be seen to have a ply buildup area 252 which effectively increases the thickness of the body 238, and results in the slope 240. The tooling sleeves include a release coated metal shim 246 and an outer consolidation tool portion 248 having a ramp for forming the slope 240. As viewed in FIG. 12, the top side of the tooling sleeve 248 is flat so as to be engageable with a universal die, such as any of the dies 256 shown in FIG. 13.

Figure 13:
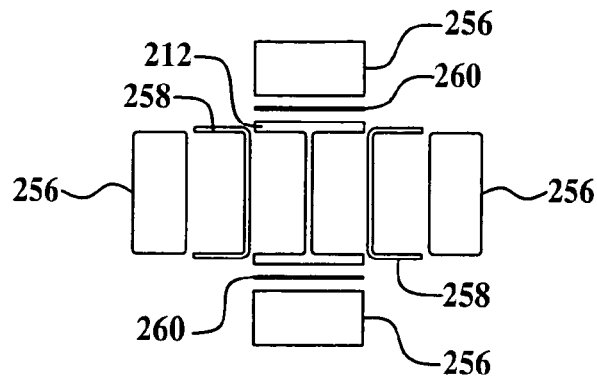
FIG. 13 is an exploded, cross sectional illustration of a thermoplastic composite I-section beam, shown in operative relationship to tooling and machine press dies used to compact the laminate plies.

FIG. 13 shows another example of a curved part 212 fabricated in accordance with the disclosed embodiments. Part 212 comprises a curved beam having an I-shaped cross section. Conventional machine dies 256 can be used to consolidate parts that have both curvature and varying thickness along their length. In this example, the tooling sleeves comprises a pair of flat metal sheets or shims 260 and a pair of tooling sleeves 258 that are generally U-shaped in cross section. The flat sheets 260 assist in forming the caps of the part 212 while sleeves 258 function to form portions of the cap as well as the web of the part 212. The faces of the sleeves 258 that face the part 212 may have tooling features such as raised areas or ramps that impart mirror image features onto the part 212. Although not specifically shown in FIG. 13, the sheets 260 and tooling sleeves 258 may be curved along their length in order to form a part 212 that is also curved.

In some cases, it may be desirable to integrate one or more metal fittings into any of the TPC laminate structures described above, including those that have curvature along the length and/or tailored or varying laminate thickness. Potential applications of TPC laminate structures having integrated metal fittings includes beams, stanchions, frames, rings, formers, skins and other structural stiffening members. In accordance with embodiments of the disclosure, metal fittings can be integrated into the previously described TPC laminate structures as part of a continuous process for fabricating these structures, as previously discussed.

Figure 19:
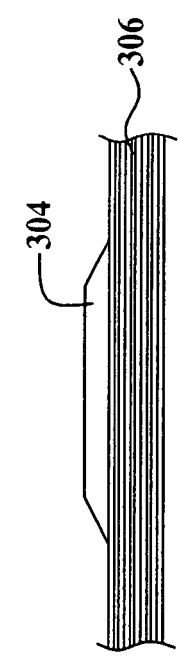

Referring now to FIGS. 19-23, a metal part or fitting such as the metal fitting 304 shown in FIG. 19 may be bonded and integrally formed with a TPC laminate structure 306 according to a method which will be discussed below in more detail. The TPC composite material in structure 306 may comprise, for example without limitation, AS4D/PEKK. The metal fitting 304 may be formed from any suitable material, depending upon the application such as, without limitation, aluminum or titanium. The metal fitting 304 may have any of various geometries and features depending on the application and purpose of the fitting 304. In the case of the application shown in FIG. 19, the metal fitting at 304 acts as a "doubler" which reinforces a location section of the TPC laminate structure 306.

Figure 20:
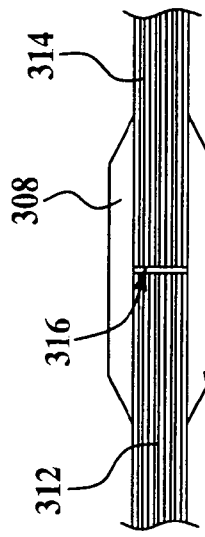
FIGS. 19-23 are cross sectional illustrations of various joints formed between a thermoplastic composite laminate and a metal fitting.

FIG. 20 illustrates a double lap splice 316 between two TPC laminates 312, 314. A pair of metal fittings 308, 310 are integrally bonded to opposite sides of laminates 312, 314, overlying the splice joints 316.

Figure 21:
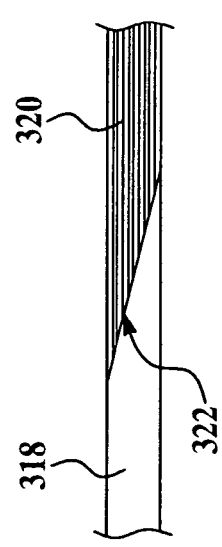

FIG. 21 illustrates the use of a scarf joint 322 between a TPC laminate 320 and a metal fitting 318.

Figure 22:
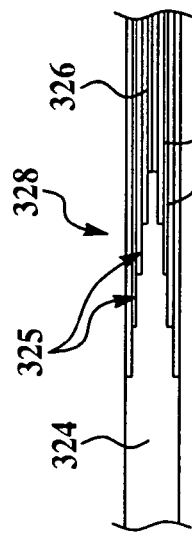

FIG. 22 illustrates a stepped lap joint 328 between a metal fitting 324 and a TPC laminate 326. The metal fitting 324 includes a series of symmetrical steps 325 along one edge thereof, which complementally receive one or more individual plies 327 of the laminate 326.

Figure 23:
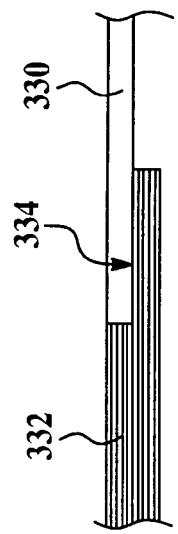

FIG. 23 illustrates a rabbet joint 334 formed between a metal fitting 330 and a TPC laminate 332.

The joints illustrated in FIGS. 19-23 are merely representative of a wide range of joint constructions and geometries that may be used in carrying out the embodiments of the disclosure.

Figure 24:
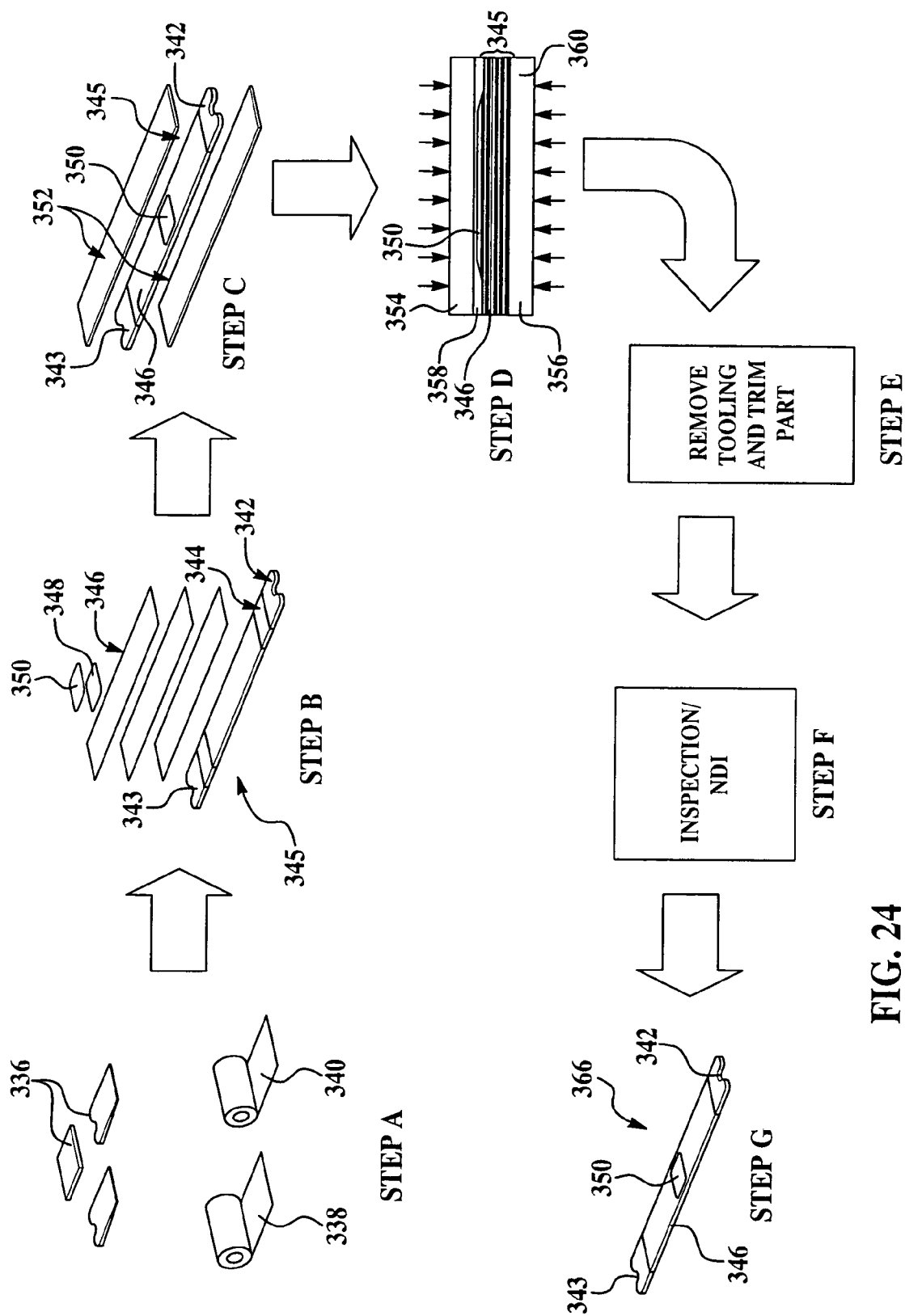
FIG. 24 is a diagrammatic illustration of the steps used in a method for fabricating thermoplastic composite laminates having integrated metal fittings according to an embodiment of the disclosure.

Referring now to FIGS. 24-26, a method continuously fabricating TPC laminate structures or parts having integrated metal fittings begins with the provision of raw materials and parts, shown in FIG. 24 as "Step A". The materials include a fiber reinforced composite material 338 with PEKK (Polyetherketoneketone) as the matrix resin (or other TPC composite material), PEKK film 340 and metal fittings 336. The reinforced composite material 338 may be in unidirectional or fabric prepreg forms. The metal fittings 336 may be machined from titanium or other suitable metals. The fittings 336 are cleaned and a high temperature bonding primer is applied to the bonding surfaces on the fittings 336. Additional components (not shown), such as the filler nuggets 26 (FIG. 5) used in manufacturing the I-beam shown in FIG. 1, are extruded or molded into discrete lengths.

Next, at "Step B", a lay-up 345 is prepared, comprising metal fittings 342, 343, 350, multiple TPC plies 346, and layers 344, 348 of PEKK film. A layer 340 of the PEKK film is applied to the primed bonding surfaces of the metal fittings 342, 343 and 350. Depending upon the type of joint and the particular application, an automated process or hand lay-up may be used to create customized stacks comprising multiple plies 346 of the reinforced composite materials from the supply of material 338, which may be in spool form. The automated process, which has been previously described, produces material blanks for multiple parts or components for a wide variety of lay-up configurations. The plies 346 in the stack may be tacked together in multiple locations using a heating or ultrasonic welding device as previously described. In the particular embodiment shown in FIG. 24, fittings 342, 343 are joined to the ends of the stack of plies 346 using any of the joints shown in FIGS. 20-23 (or other joint configurations), and the metal fitting 350 is positioned on top of the plies 346 and acts as a doubler in the finished part.

The lay-up 345 is positioned between consolidation tools 352 of the type previously mentioned, as shown in "Step C" in FIG. 24. The consolidation tools 352 may include surface features that are transferred to the laminate plies 346 in order to create thickness tailoring, thickness variations and curvatures or other part features. These part features may include pockets to accommodate features of the fittings 342, 343 and 350, as well as ply buildup ramps, part curvatures, etc. The sides of the tool 352 which mate with a CCM machine 368 is of a constant size and shape to match standard dies on the CCM machine 368. The locations of the features on the tools 352 are coordinated with the features of the stack of plies 346. Thin steel sheets (not shown) of the type previously described, may be used on the non-tool side of the lay-up 346.

"Step D" in FIG. 24 and FIG. 25 better illustrate the relationship between the tools 352 and the lay-up 345. The consolidation tools 352 include tool members 358, 360 engaging opposite sides of the lay-up 345. The tool members 358, 360 are engaged by press platens 354, 356 which squeeze the tool members 358, 360 together in order to consolidate the plies 346 lay-up 345. One of the tools 358 includes a pocket having a shape matching that of the doubler fitting 350. The second tool member 360 is smooth on both of its opposite faces.

As shown in FIG. 26, the lay-up 345 is fed along with the tool members 358, 360 into the CCM machine 368, in the direction of the arrow 347. Although not specifically shown in FIG. 26, the lay-up 345 along with the consolidation tool members 358, 360 may pass through a pre-forming station such as that shown in FIG. 5, where the lay-up 345 is preformed into the approximate shape of the final part 366.

The CCM machine 368 consolidates the lay-up 345, including fittings 342, 343, 350, into a solid, monolithic part. The lay-up 345 and consolidation tooling 352, are continuously moved, incrementally through the CCM machine 368 so that press platens 354, 356 apply pressure to successive sections of the tooling 352 as the lay-up 345 is moved each incremental step. It should be noted here that other consolidation processes may be used, such as those employing heated presses (not shown).

As shown in FIG. 24 at "Step E", following consolidation, the tooling 352 is removed from the consolidated part 366 and the part 366 is trimmed. At step "F", the part 366 is inspected, using nondestructive inspection techniques. The final part 366 shown in "Step G" is a monolithic, fully consolidated structure in which the metal fittings 342, 343 and 350 are formed integral with the consolidated plies 346 of the TPC laminate.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of manufacturing a part having a joint between a polymeric composite laminate and a metal fitting, the method comprising
    forming a lay-up by positioning a metal fitting adjacent to a traverse edge of a stack comprising plies of a composite material tacked together such that at least part of an edge of the metal fitting contacts at least part of the edge of the stack;
    placing the lay-up between two metal tools;
    feeding the lay-up through a continuous compression machine;
    consolidating the layup to form the joint, wherein consolidating is performed by the continuous compression machine, wherein feeding the lay-up through a continuous compression machine comprises feeding the metal tools and the lay-up into the continuous compression machine.

2. The method of claim 1, further comprising introducing a thermoplastic film between the metal fitting and one of the plies.

3. The method of claim 1, wherein the plies are tacked together at multiple locations by heating or ultrasonic welding.

4. The method of claim 1, further comprising:
    preforming the lay-up into the approximate shape of the part.

5. The method of claim 1, wherein the composite material includes a matrix resin component having a free flowing temperature, and the method further comprises:
    preforming the lay-up into the approximate shape of the part; and
    heating the preformed lay-up to at least the free flowing temperature of the matrix resin component of the composite material before feeding the lay-up through the continuous compression machine.

6. The method of claim 1, wherein the method further comprises:
    preforming the lay-up into the approximate shape of the part, and
    wherein the consolidating includes pressing at least one of the metal tools against the preformed lay-up to impart features of the tool on the preformed lay-up.

7. The method of claim 1, wherein the consolidating is performed by incrementally moving the lay-up through the press.

8. The method of claim 1, wherein the polymeric composite laminate is a thermoplastic composite laminate.

9. A method of manufacturing a part comprising a part having a joint between a polymeric composite laminate and a metal fitting, the method comprising:
    forming a lay-up by positioning a metal fitting adjacent to a traverse edge of a stack comprising plies of a composite material tacked together such that at least part of an edge of the metal fitting contacts at least part of the edge of the stack;
    placing the lay-up between two metal tools;
    feeding the lay-up with the two metal tools through a continuous compression machine; and
    consolidating the layup, wherein consolidating comprises applying pressure to the two metal tools using press platens of the continuous compression machine.

10. The method of claim 9, further comprising:
    cleaning the surface of the metal fitting; and
    applying a bonding primer to the cleaned surfaces of the metal fitting.

11. The method of claim 10, further comprising:
applying a resin film to the primed surfaces of the metal fitting.

12. The method of claim 9, further comprising:
preforming the lay-up into the approximate shape of the part.

13. The method of claim 9, wherein consolidating includes pressing the two metal tools against the lay-up and wherein at least one of the two metal tools imparts features of the at least one tool on the lay-up.

14. A method of manufacturing a part comprising a polymeric composite laminate and an integrated metal fitting, the method comprising:
positioning a first stack adjacent a second stack such that at least a part of a first traverse edge of the first stack contacts at least a part of a second traverse edge of the second stack, the first stack comprising a first number of plies of a composite material tacked together and the second stack comprising a second number of plies of a composite material tacked together;
positioning a metal fitting on at least a portion of the first stack and on at least a portion of the second stack to form a lay-up;
placing the lay-up between two metal tool members;
feeding the lay-up with the two metal tool members through a continuous compression machine; and
consolidating the layup, wherein consolidating comprises applying pressure to the two metal tool members using press platens of the continuous compression machine.

15. The method of claim 14, further comprising:
cleaning the surface of the metal fitting; and
applying a bonding primer to the cleaned surfaces of the metal fitting.

16. The method of claim 15, further comprising:
applying a resin film to the primed surfaces of the metal fitting.

17. The method of claim 14, further comprising:
preforming the lay-up into the approximate shape of the part.

18. The method of claim 14, wherein consolidating includes pressing the two metal tools against the lay-up and wherein at least one of the two metal tools imparts features of the at least one tool on the lay-up.

19. A method of manufacturing a part comprising a polymeric composite laminate and an integrated metal fitting, the method comprising:
positioning a first stack adjacent a second stack such that at least a part of a first traverse edge of the first stack contacts at least a part of a second traverse edge of the second stack to form a joint, the first stack comprising a first number of plies of a composite material tacked together and the second stack comprising a second number of plies of a composite material tacked together;
positioning a metal fitting over the joint to form a lay-up;
placing the lay-up between two metal tool members, one of the two metal tool members including a pocket having a shape matching that of the metal fitting;
feeding the lay-up with the two metal tool members through a continuous compression machine; and
consolidating the layup, wherein consolidating comprises applying pressure to the two metal tool members using press platens of the continuous compression machine.

20. The method of claim 19, further comprising:
cleaning the surface of the metal fitting; and
applying a bonding primer to the cleaned surfaces of the metal fitting.

21. The method of claim 20, further comprising:
applying a resin film to the primed surfaces of the metal fitting.

22. The method of claim 19, further comprising:
preforming the lay-up into the approximate shape of the part.

23. The method of claim 19, wherein consolidating includes pressing the two metal tools against the lay-up and wherein at least one of the two metal tools imparts features of the at least one tool on the lay-up.

24. The method of claim 19, further comprising:
positioning a second metal fitting on an opposite side of the joint prior to placing the lay-up between the two metal tool members.

* * * * *